United States Patent [19]

Barber

[11] 4,429,867
[45] Feb. 7, 1984

[54] FLOTATION AMUSEMENT DEVICE

[75] Inventor: Jerry L. Barber, Greenville, S.C.

[73] Assignee: Wayne P. Comstock, Greenville, S.C.; a part interest

[21] Appl. No.: 317,769

[22] Filed: Nov. 3, 1981

[51] Int. Cl.³ .............................................. A63G 3/00
[52] U.S. Cl. ....................................... 272/32; 104/73; 193/2 A; 405/122
[58] Field of Search ............... 272/32, 56.5 R, 56.5 S, 272/71, 72, 1 B, 26; 104/73, 70, 58, 59, 69; 273/140; 182/48, 51, 52; 4/488, 489, 491, 492, 494; 119/61; 46/1 K, 91; 193/2 R, 2 A; 405/43, 119, 120, 121, 122, 123, 124, 126

[56] References Cited

U.S. PATENT DOCUMENTS

| 1,014,975 | 1/1912 | Poehlman | 46/91 |
| 2,035,835 | 3/1936 | Räber | 4/488 |
| 2,231,089 | 2/1941 | Rorer | 46/1 K |
| 2,604,055 | 7/1952 | Snowden | 104/73 |
| 2,886,828 | 5/1959 | Lattuca | 4/494 |
| 3,106,394 | 10/1963 | Gelbart | 46/91 X |
| 3,343,793 | 9/1967 | Waser | 104/69 X |
| 3,970,300 | 7/1976 | von Wendt | 272/56.5 R X |
| 4,299,171 | 11/1981 | Larson | 104/70 |

FOREIGN PATENT DOCUMENTS

| 761489 | 1/1934 | France | 272/26 |
| 337805 | 11/1930 | United Kingdom | 104/73 |

OTHER PUBLICATIONS

The Alpine Slide Business Week, p. 26, Aug. 9, 1976.

Primary Examiner—Robert A. Hafer
Assistant Examiner—Arnold W. Kramer
Attorney, Agent, or Firm—Bailey & Hardaway

[57] ABSTRACT

A portable amusement device wherein flotation of participants occurs on a continuous basis within flotation devices comprises a plurality of trough defining segments each being formed with double side walls and end walls with the double side walls defining a hollow section to permit nesting of the individual segments for shipment and storage. The trough segments are joined to one another to form a continous trough with a pump in at least one hollow section to continuously move a flotation medium throughout the trough and thus propel participants therethrough.

8 Claims, 7 Drawing Figures

FLOTATION AMUSEMENT DEVICE

BACKGROUND OF THE INVENTION

This invention relates generally to the art of amusement devices and more particularly to a portable flotation amusement device.

Various amusement devices exist within the prior art wherein the flotation of participants is utilized as a means of entertainment. One such device is frequently referred to a tunnel of love wherein a boat is moved through a channel at a permanent location with the participants in the boat not having to assist in propulsion of the boat. Various entertainment devices designed for children embody boat structures which are moved seriatim through a tank device by a mechanical attachment.

There has, however, not been in existence an amusement device designed for children wherein the participants experience the instability associated with pure flotation while simultaneously being free of the perils normally associated with such instability.

SUMMARY OF THE INVENTION

It is thus an object of this invention to provide a novel flotation amusement device which is capable of transporting human beings and particularly children in a safe and secure manner while simultaneously providing a sensation of instability.

It is a further object of this invention to provide such a device which is portable to the extent that it may be assembled, disassembled and reassembled for moving from one site to another.

It is a still further object of this invention to provide such a device which is capable of construction into various geometries.

These as well as other objects are accomplished by an amusement device having a plurality of trough defining segments which may be joined to one another to form a continuous trough. The trough contains an aqueous flotation medium for supporting a flotation device. Pumping means are provided to move the flotation medium continuously through the trough so as to transport one or several flotation devices continuously through the trough.

DETAILED DESCRIPTION

In accordance with this invention, it has been found that a portable flotation amusement device may be formed from a plurality of trough defining segments which are joined together to form a continuous trough. Pumping means pump a flotation medium through the continuous trough for the purposes of moving flotation devices about the continuous path defined by the trough. It has been found that by forming the segments into straight and curved segments, a variety of geometries may be created; all of which define a continuous trough. Various advantages will become apparent from a reading of the following specification with reference to the several Figures of drawing.

Figure 1:
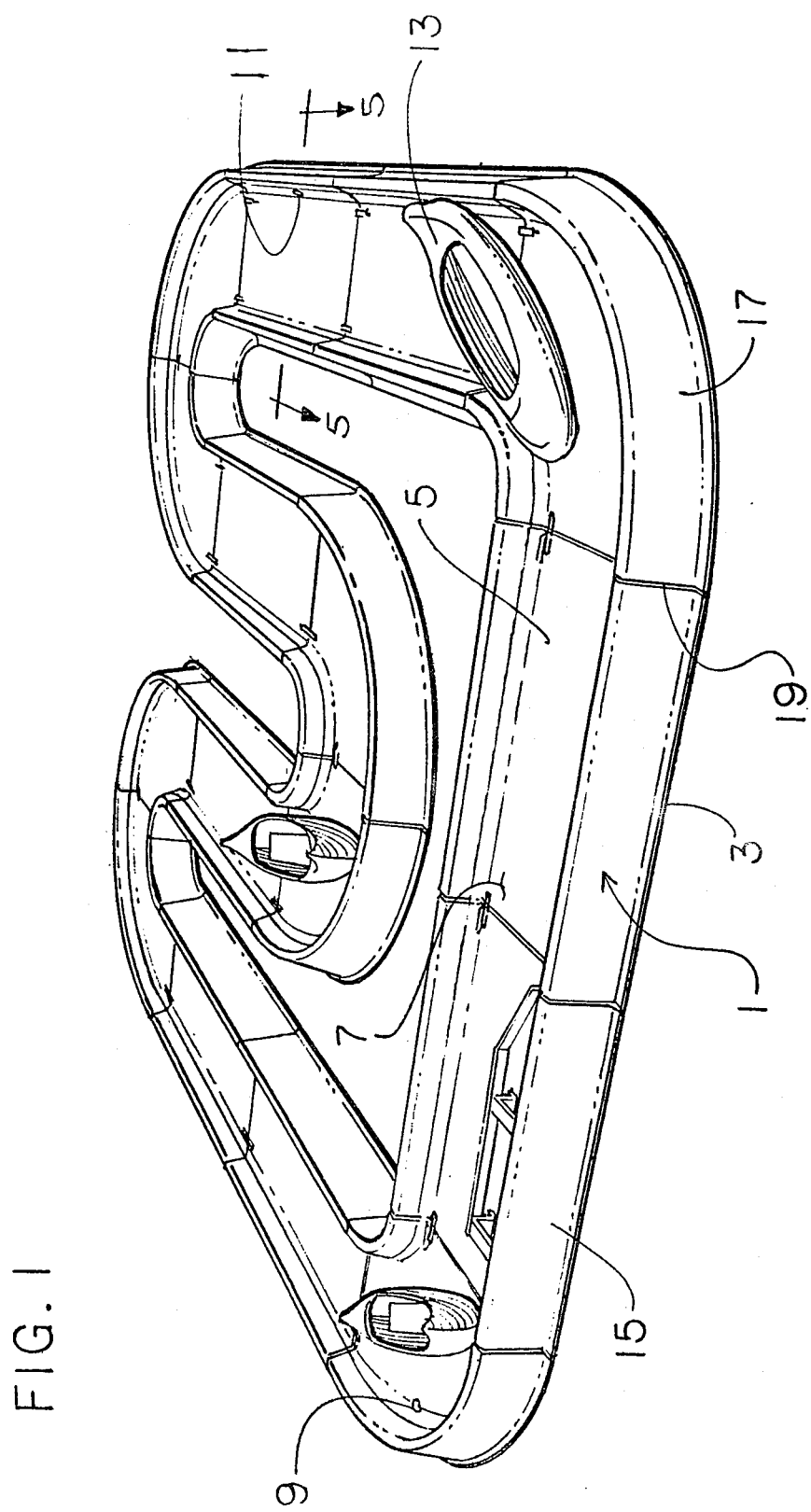
FIG. 1 is a perspective view of an amusement device in accordance with this invention.

FIG. 1 of the drawing is a perspective view of an assembled floatation device in accordance with this invention. The device 1 comprises a plurality of trough defining segments 3 which are joined together to form a continuous trough 5. The continuous trough 5 defined by the trough defining segments 3 contains an aqueous flotation medium 7 which is continuously pumped so that there is a flow of water from outlets 9 and 11. The flow of water through the continuous trough provides propulsion to flotation devices 13 to continuously move the flotation devices about the continuous trough.

An aspect of this invention which is highly desirable in an amusement device is the ability to continuously load and unload participants from a single flotation device without interrupting the activity of participants in other flotation devices.

In the preferred embodiment of this invention, the trough defining segments 3 are formed in either straight sections 15 or curved 90° sections 17. Preferably the curved sections are formed in both left and right handed modes. With this geometry, the overall configuration of the continuous trough may be varied considerably in appearance and geometry and adapted to fit various size locations. For example, if the amusement device is to be moved from one carnival location to another during various carnival seasons, each carnival location will not have equal spaces for such an amusement device. Portability is also an advantage to a permanent amusement park, since changes and additions to the park may require moving some rides. The resale value of a portable ride is also much greater than for a permanent structure.

The amusement device of this invention may thus be varied from a small assembly of four assembled units of curved sections 17 to produce a circular continuous trough to the large convolute type of trough shown in FIG. 1 or even larger more diverse geometries. There is virtually no limit to the sizes and configurations which may be created with only the two geometries of trough defining segments illustrated in FIG. 1. However, this is a preferred feature and other geometries for such segments may be utilized.

Figure 2:
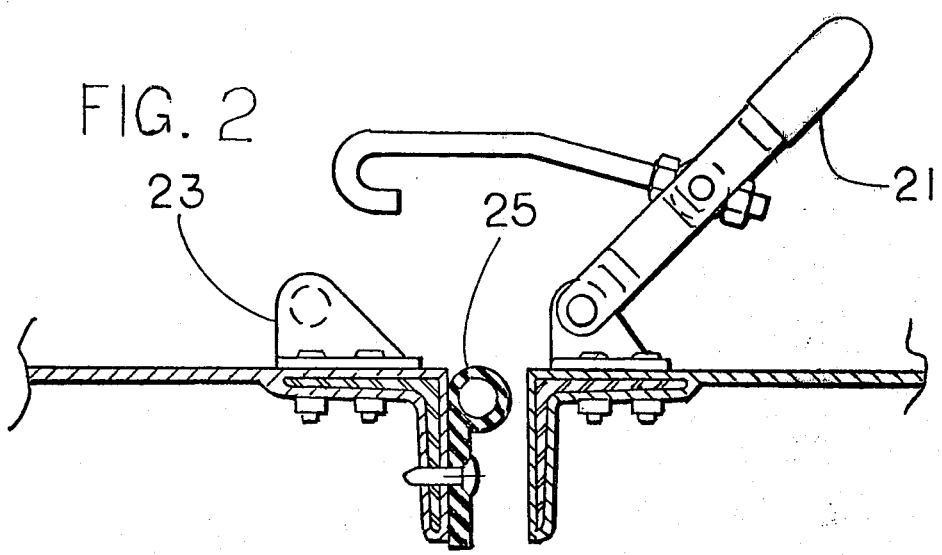
FIG. 2 is a cross section of a juncture between two trough defining segments in accordance with this invention.

The key to the portability of the amusement device in accordance with this invention is the ability to assemble and disassemble the device on site. This ability is brought about by joinder of the trough defining segments at the juncture 19 between segments. The juncture 19 between the assembled segments is created by means for joining the segments to one another. The means for joining as illustrated in FIG. 2 of the drawings comprises a clamp 21 which interlocks with a mating portion 23 on the adjoining segment. Between the segments is a flexible seal 25 which seals the segments from the leakage of water through. Additionally it is preferred that the seal 25 be in the form of a hollow flexible cylinder so as to permit flexibility of the spacing between segments based upon the fitting of the clamp 21.

It is preferred that clamp 21 when engaged be provided with means for preventing unintentional dislodgement such as a hitch pin (not shown) received in mating section 23 through a hole so as to make the removal of clamp 21 impossible without removal of the hitch pin. However, during actual use it has been found that the weight of the water contained within the trough maintains the trough defining segments in position by virtue of the weight of such water so that even intentional dislodgement of the clamp does not result in leakage of water from the trough. For this reason, during disassembly of the trough defining segments, it is necessary to drain water from the trough prior to any disassembly. For this purpose, a drain may be included on one of the segments or the water may be simply siphoned from the continuous trough.

Figure 3:
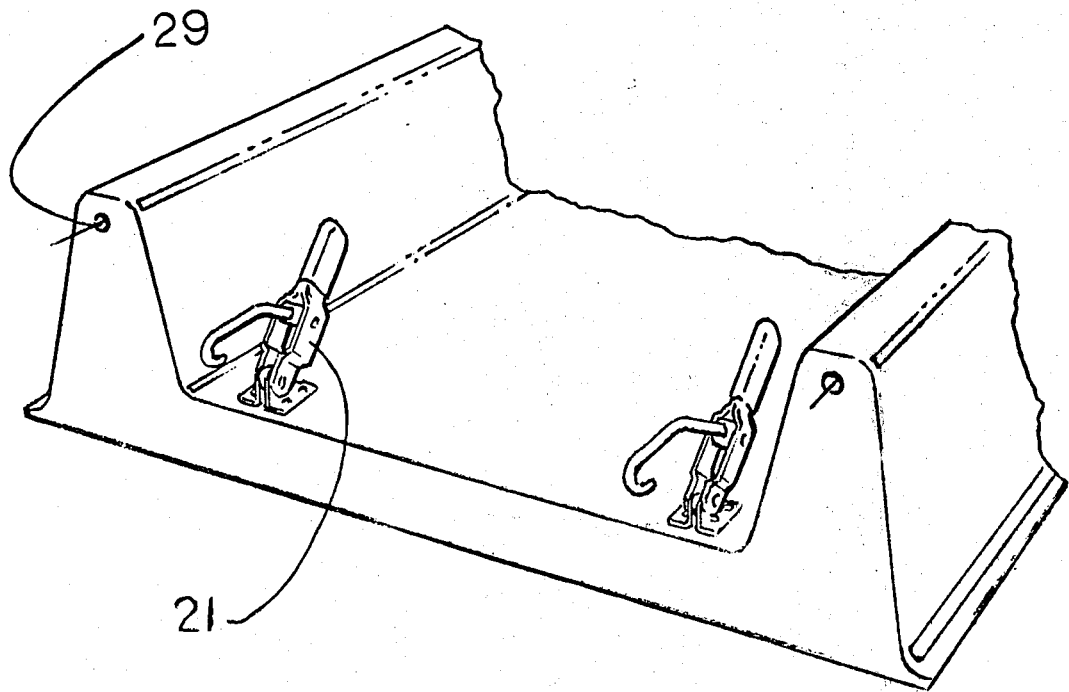
FIGS. 3 and 4 illustrate means for forming a juncture between assembled segments.
Figure 4:
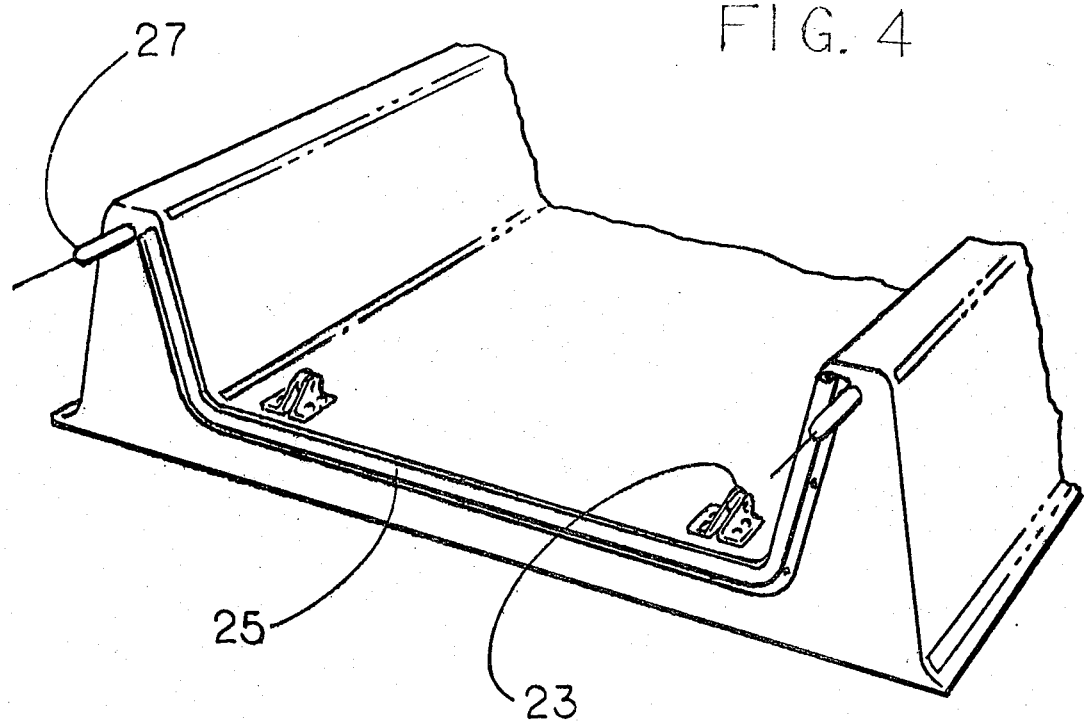
Figure 5:
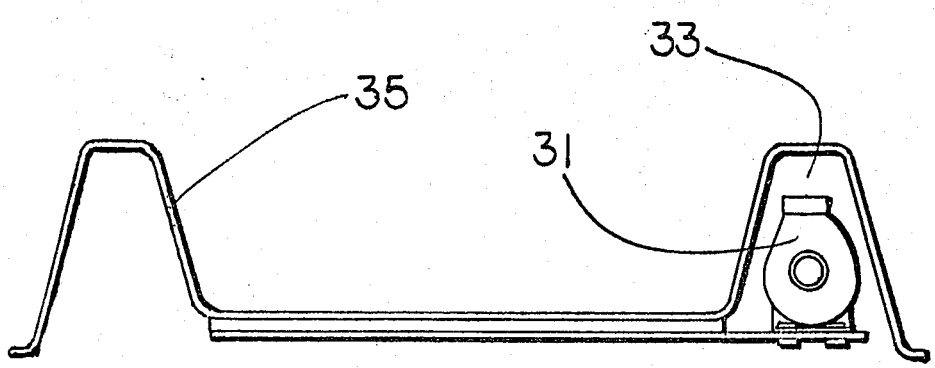
FIG. 5 is a cross section along the line 5—5 of FIG. 1 illustrating the placement of pump means within an individual trough defining segment.

Complementary mating segments are illustrated in FIGS. 3 and 4 of the drawings wherein a preferred alignment means 27 and 29 are illustrated along with means for joining the segments one to another; 21, 23 and 25. Curved sections are preferably formed in both the left and right handed modes, i.e., reversals of alignment means and means for joining, so as to provide diverse geometries upon assembly.

Figure 6:
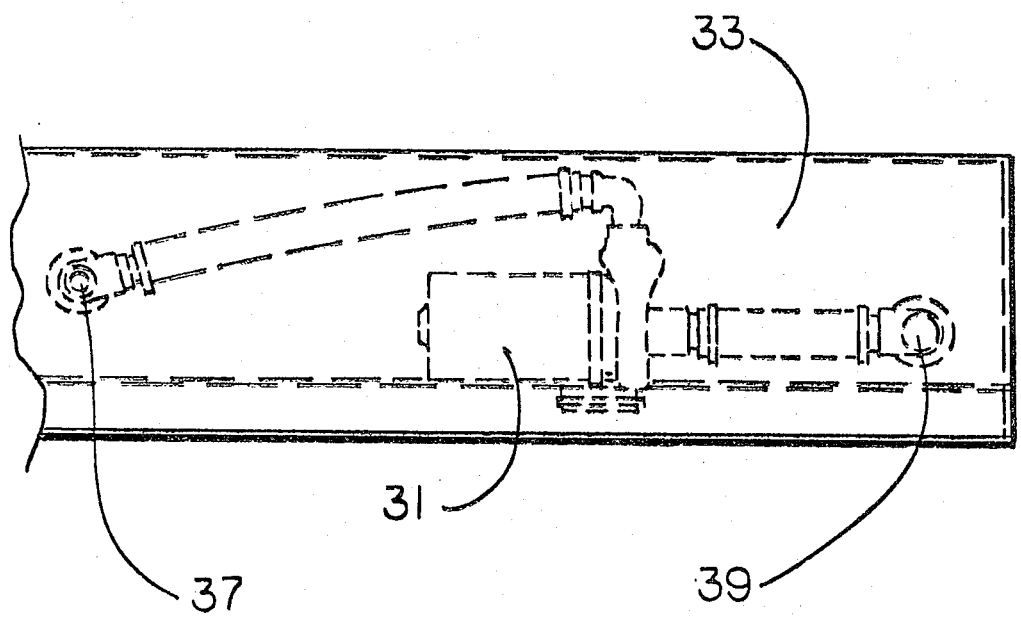
FIG. 6 is a right side view of a portion of the FIG. 5 view.

Preferably the trough defining segments are formed of molded resin reinforced with fiberglass. Such a structure creates a hollow shell in the wall portion thereof. A cross section along the line 5—5 of FIG. 1 illustrates the placement of pump means 31 within the hollow shell 33 of segment 35. FIG. 6 is a side view illustrating the placement of pump 31 within shell 33. As is seen in FIG. 6, the pump assembly includes an intake 37 and an exhaust 39. Pump 31 for use with small children may be substantially a 1 horsepower motor of the type normally utilized within a swimming pool. Four such pumps are preferably utilized in the FIG. 1 configuration.

Figure 7:
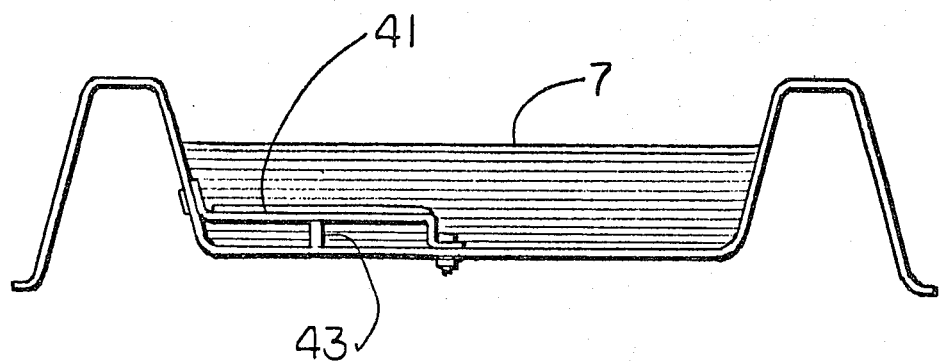
FIG. 7 is a cross section view of a trough defining section illustrating a loading platform.

The cross sections depicted in FIG. 6 and 7 illustrate the ability of the trough defining segments to be nested one within the other. This construction greatly facilitates the portability of the amusement device in accordance with this invention. It has been found that an assembly such as that depicted in FIG. 1 of the drawing may be carried entirely within the bed of a pickup truck.

FIG. 7 of the drawings illustrates a cross section wherein an aqueous flotation medium 7, i.e., water. Generally a depth for grammar school age children and younger is a depth of 5 to 7 inches. This depth of water is not sufficient to endanger participants in the event of being capsized while imparting to the flotation device a feeling of instability. Due to this feeling of instability, a loading platform 41 is illustrated in FIG. 7. The loading platform is utilized by an operator by placing a flotation device thereon to assist in entry and exit of the flotation device by a participant. Essentially the loading platform 41 supports the flotation device during entry and exit by participants and permits the flotation device to be launched therefrom. Additionally the loading platform may comprise an inclined ramp 43 to assist in placement of an occupied flotation device upon the ramp for purposes of exiting the flotation device. While this particular stabilizing means has been illustrated, it is understood that various other stabilization arrangements may be equally satisfactory. For example, a strap may be wrapped about the flotation device during entry and exit thereof of a clamp utilized to secure the flotation device to the particular trough defining segment.

It is thus seen that this invention provides a novel amusement device which is sufficiently portable to permit assembly and disassembly at diverse sites and which provides to participants a sensation not heretofore available. It is apparent that many diverse forms of flotaton devices may be utilized within the amusement device of this invention. While FIG. 1 of the drawings illustrates a canoe type structure, any suitable device adaptable to flotation may be utilized. For example, the flotation device may be in the form of an animal such as a duck having seating arrangements therein.

It is contemplated that a log flume is within the scope of this invention wherein the flotation devices are in the form of logs and several of the trough defining segments are provided with moving tread so as to elevate logs and then releases the logs down an inclined ramp having a flow of water thereon and into a pool of rapids wherein the log flotation device is propelled throughout the remainder of the continuous trough and ultimately arrive again at the moving tread.

Many alternatives, however, will become apparent from a reading of the above description, such alternatives are embodied within the spirit and scope of this invention, and is defined by the following appended claims.

That which is claimed is:

1. A portable amusement device, comprising:
   a plurality of trough defining segments;
   each of said trough defining segments being formed with double side walls and end walls with said double side walls defining a hollow section to permit nesting of individual segments for shipment and storage;
   means for joining said segments to one another to form a continuous trough;
   pump means in at least one hollow section connected to said trough for mov ing an aqueous flotation medium through said continuous trough.

2. The amusement device in accordance with claim 1 wherein said means for joining comprises a flexible seal and clamping means.

3. The amusement device according to claim 1 further comprising alignment means between trough defining segments.

4. The amusement device according to claim 1 further comprising flotation devices upon an aqueous flotation medium within said continuous trough capable of traversing the extent of said continuous trough.

5. The amusement device according to claim 4 further comprising stabilizing means in one of said troughs to assist in entry and exit of said flotation device by a human being.

6. The amusement device in accordance with claim 1 wherein said trough defining segments comprise straight segments and 90° curved segments so as to provide a plurality of alternative geometries for said continuous trough.

7. The amusement device in accordance with claim 6 wherein said curved segments are both left and right handed.

8. The amusement device in accordance with claim 1 wherein said pump means comprises a plurality of pumps for pumping said aqueous flotation medium horizontally through said continuous trough to propel flotation devices and human occupants about said continuous trough.

* * * * *